US006963534B1

(12) United States Patent
Shorey et al.

(10) Patent No.: US 6,963,534 B1
(45) Date of Patent: Nov. 8, 2005

(54) METHODOLOGY FOR IMPROVING THE PERFORMANCE OF ASYNCHRONOUS DATA TRAFFIC OVER TDD/TDMA WIRELESS NETWORKS

(75) Inventors: Rajeev Shorey, New Delhi (IN); Ashu Razdan, New Delhi (IN); Abhishek Das, Madhya (IN); Abhishek Ghose, Mumbai (IN); Huzur Saran, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 1015 days.

(21) Appl. No.: 09/680,168

(22) Filed: Oct. 5, 2000

(51) Int. Cl.[7] .............................................. H04J 3/24
(52) U.S. Cl. ...................... 370/230; 370/337; 370/471; 370/474; 370/347; 370/349; 370/428; 370/466; 455/453
(58) Field of Search ................................ 370/230, 337, 370/345, 346, 347, 449, 468, 470, 471, 474, 370/349, 395.1, 395.4, 412, 428, 429, 465–467; 455/450, 452.1, 453

(56) References Cited

U.S. PATENT DOCUMENTS 6,480,505 B1 * 11/2002 Johansson et al. .......... 370/449

* cited by examiner

*Primary Examiner*—Alpus H. Hsu
*Assistant Examiner*—Daniel J. Ryman
(74) *Attorney, Agent, or Firm*—McGinn & Gibb, PLLC; T. Rao Coca, Esq.

(57) ABSTRACT

The present invention relates to a computer implemented system for transferring data over a master driven TDD/TDMA based wireless network operating with minimum delay in end-to-end transmission by achieving optimum time slot utilization by minimizing the number of baseband packets created for each Link layer packet, where each baseband packet of is a size corresponding to one of a permitted set of capacities '$C_1, C_2, \ldots C_n$'. The system also optimizes sharing of bandwidth, higher link utilization and low baseband packet transmission queue occupancy by adaptive scheduling of the transmission of the baseband packets in the queues. The invention also provides a method and computer program product for the above system.

15 Claims, 9 Drawing Sheets

Figure 5 : Simulation Scenario

Figure 6: TCP throughput for different values of *num_sticky*

Figure 7: TCP throughput for different value of *num_sticky* with *scale* set to 2

Figure 8: Link utilization with AFP variations

METHODOLOGY FOR IMPROVING THE PERFORMANCE OF ASYNCHRONOUS DATA TRAFFIC OVER TDD/TDMA WIRELESS NETWORKS

FIELD OF INVENTION

The present invention relates to a new methodology for improving the performance of asynchronous data traffic over the TDD/TDMA Wireless Networks.

BACKGROUND OF THE INVENTION

TDD/TDMA Wireless technologies such as Bluetooth technology [BLU] allow for the replacement of the numerous proprietary cables that connect one device to another with a universal short-range radio link. Beyond untethering devices by replacing cables, such technologies provide a universal bridge to existing data networks, a peripheral interface, and a mechanism to form small private ad-hoc groupings of connected devices away from fixed network infrastructures. For example, interconnected devices in a Bluetooth system form a piconet, which can have one master and upto seven slaves.

The Bluetooth system is used as an example to explain the various aspects of this invention. Bluetooth has a number of distinctive features such as:

Support for both data and voice traffic

Frequency hopping to avoid interference

A Master driven Time Division Duplex (TDD) system at the Medium Access Control (MAC) layer to support full duplex transmission Segmentation and Reassembly (SAR) to handle large data packets There are three basic protocols in any Bluetooth system: the Baseband Protocol, Link Manager Protocol (LMP) and Logical Link Control and Adaptation Protocol (L2CAP). The Baseband Protocol controls the hardware that turns the radio signals (transmit/receive) into a digital form that can be processed by the host application. LMP and L2CAP are layered above the Baseband Protocol and they reside in the datalink layer. LMP carries out link setup and authentication. L2CAP supports higher level protocol multiplexing, packet Segmentation and Reassembly (SAR), and also conveys quality of service information.

Segmentation and reassembly (SAR) operations are used to improve efficiency by supporting a maximum transmission unit (MTU) size larger than the largest baseband packet. This reduces overhead by spreading the network and transport packets used by higher layer protocols over several baseband packets.

SAR is performed at the L2CAP layer in which the L2CAP packets are divided into multiple baseband packets covering 1, 3 or 5 slots. These baseband packets are then enqueued into the baseband buffer. Using a Medium Access Control (MAC) scheduling algorithm, these packets are sent at appropriate intervals over the RF link.

In the future, Bluetooth will seek to support communication-intensive applications such as multimedia teleconferencing, WWW browsing, etc. Supporting such applications requires the network to maintain sustained quality of service (QoS) to packet flows over scarce wireless resources. In wireline networks, QoS requirements are typically satisfied by a combination of resource reservation (at the flow level) and fair resource allocation/packet scheduling (at the packet level).

However, the problem of fair packet scheduling in Bluetooth has remained largely unaddressed.

In Bluetooth systems, conventional scheduling policies such as Round Robin perform poorly as they are not suited for tight coupling of uplink-downlink scheduling and result in slot wastage and unfairness. Scheduling in Bluetooth is complex due to variable sized data packets. Bluetooth uses a Master-driven time division duplexed (TDD) slot structure for resolving contention over the wireless links. There is a strict alternation of slots between the Master and the Slaves. The Master can only send packets to a Slave in even slots while the slave can send packets to the Master in an odd slot [BLU]. Further, the task of scheduling is vested with the Master. Note that from the above description, it is not difficult to infer that there could be a wastage of slots in the TDD scheme, since if only one of the Master or the Slave has data to send, a slot gets wasted.

Another important issue in MAC (Medium Access Control) scheduling is that of fairness. A desirable scheduler is one that minimizes maximum session completion times, fairly distributes bandwidth among all active sessions and minimizes delay for interactive sessions. Efficient MAC scheduling algorithms need to be designed for Bluetooth systems to maximize slot utilzation and hence improve the channel throughput.

A number of approaches for scheduling in wireless networks have been studied earlier. In [KAL] two new scheduling algorithms are identified for Bluetooth. These policies use information about the size of the HOL (head of the line) packet to schedule TDD slots effectively. The new policies are HOL Priority and HOL K-fairness. Channel state dependent packet scheduling (CSDP) policies to improve TCP throughout over wireless LANs have been proposed in [BHA].

U.S. patent application Ser. No. 09/434,583 (issued as U.S. Pat. No. 6,680,909) describes a scheduling method that gives high system throughput and fairness amongst different connections in a wireless network.

In U.S. Pat. No. 6,075,791, a system is disclosed which services a plurality of queues associated with respective data connections such that the system guarantees data transfer rates and data transfer delays to the data connections. This is achieved by associating each connection having at least one data packet waiting in its associated queue with a timestamp generated as a function of system parameters such as the number of queues that are backlogged, (b) the data transfer rate guaranteed to each connection, each timestamp weighted by the data transfer rate guaranteed to the corresponding connection. This system, however, is not optimized for wireless networks such as Bluetooth.

In U.S. Pat. No. 4,949,395, a method is described for dynamically allocating time slots to connections on the radio channels, in order to increase the capacity on the radio channels. The maximum number of simultaneous connections on the radio channels is more than the available number of the time slots per frame. When there are more connections established on a first and a second radio channel than time slots per frame, the connections share the available time slots in accordance with a determined multiframe time slot allocation scheme known to the base station and the mobile stations. However, this method cannot be directly applied to Bluetooth as it has characteristics distinct from the mobile network scenario discussed in this method.

In U.S. Pat. No. 6,069,885, a method for scheduling transmissions between a plurality of communication sites within a wireless system. The system provides service to an area divided into sectors, each of which communicate information in at least one time subframe according to a schedule that minimizes interference between sites.

In U.S. Pat. No. 5,844,890, a method and apparatus are provided for scheduling the transmission of cells of a plurality of data streams in a communications network. A best effort scheduler is provided for scheduling the transmission of cells of a plurality of data streams in a communications network. This work is, however, not optimized for a wireless network.

In the case of Bluetooth, Segmentation and Reassembly (SAR) schemes have not been studied earlier in detail. In [KAL], two new Segmentation and Reassembly (SAR) policies, ISAR and Adaptive SAR, are identified for Bluetooth, keeping data flow in mind, but an exact algorithm for this purpose is not described. These algorithms consider only the packet size distribution at the baseband level, but do not account for the effect of Segmentation and Reassembly (SAR) on application data packets of varying sizes.

In International Patent application No. WO09904521A2, a method and apparatus for providing segmentation and reassembly over wireless and satellite links is provided. Variable sized packets are divided into segments having a size equal to that of an Asynchronous transfer mode (ATM) cell and are then arranged in a Segmentation and Reassembly (SAR) frame having in its overhead an indication as to the length and unique identity of the frame, each segment also having a header that uniquely identifies the segment. This method applies only to an ATM scenario and cannot be directly applied to Bluetooth.

A method for partitioning data load and unload functions within an interface system for use with an ATM system is discussed in U.S. Pat. No. 5,625,625. For segmentation, a transmit load engine controls storage of data from packets into an external buffer memory; whereas receive unload engine handles extraction of data from memory, segmenting data into cells and transmitting cells to the ATM system. For reassembly, a receive load engine handles receiving and storing the cells corresponding to the packets into a memory; whereas a receive unload engine controls extraction of data from memory and transmission to the system. The Segmentation and Reassembly (SAR) controller is designed for an ATM system and must be significantly changed for use in Bluetooth.

OBJECT AND SUMMARY OF THE INVENTION

The object of the present invention is to obviate the above drawbacks by providing an efficient methodology for data transmission over TDD/TDMA wireless networks.

To achieve the said objective this invention provides a computer implemented system for transferring data over a master driven TDD/TDMA based wireless network characterized in that it operates with minimum delay in end-to-end transmission by including:
means for achieving optimum time slot utilization by minimizing the number of baseband packets created for each Link layer packet, each baseband packet being of a size corresponding to one of a permitted set of capacities '$C_1, C_2, \ldots C_n$', and
means for optimum sharing of bandwidth, higher link utilization and low baseband packet transmission queue occupancy by adaptive scheduling of the transmission of said baseband packets in said queues.

The means for minimizing the number of baseband packets created for each Link layer packet is an SAR-OSU algorithm comprising converting said Link layer packet into as many baseband packets of highest capacity '$C_n$' as possible and repeating the conversion process on the unconverted bytes using each successive lower capacity baseband packet size until all the unconverted bytes have been converted into baseband packets.

The master driven TDD/TDMA based wireless network is a Bluetooth network and Link layer packet is L2CAP packet.

The said means for adaptive scheduling of transmission is an 'AFP' algorithm whereby a baseband packet transmission queue with a size greater than a defined threshold is continuously polled for a defined number of transmissions as long as its size remains greater than said defined threshold.

The above system further comprises means for increasing the transmission polling interval for a baseband packet transmission queue with low packet traffic, such as when a 'poll' packet is sent instead of a 'data' packet.

The present invention further provides a computer implemented method for transferring data over a master driven TDD/TDMA based wireless network characterized in that it operates with minimum delay in end-to-end transmission by:
achieving optimum time slot utilization by minimizing the number of baseband packets created for each Link layer packet, each baseband packet being of a size corresponding to one of a permitted set of capacities '$C_1, C_2, \ldots C_n$', and
maintaining optimum sharing of bandwidth, higher link utilization and low baseband packet transmission queue occupancy by adaptive scheduling of the transmission of said baseband packets in said queues.

The minimizing of the number of baseband packets created for each Link layer packet is by an SAR-OSU algorithm comprising converting said Link layer packet into as many baseband packets of highest capacity Cn as possible and repeating the conversion process on the unconverted bytes using each successive lower capacity baseband packet size until all the unconverted bytes have been converted into baseband packets.

The master driven TDD/TDMA based wireless network is a Bluetooth network and Link layer packet is L2CAP packet.

The said adaptive scheduling of transmission is by an Adaptive Flow-Based Polling ('AFP') algorithm whereby a 25 queue with a size greater than a defined threshold is continuously polled for a defined number of transmissions as long as its size remains greater than said defined threshold.

The above method further comprises increasing the transmission polling interval for a baseband packet transmission queue with low packet traffic, such as when a 'poll' packet is sent instead of a 'data' packet.

The instant invention further relates to a computer program product comprising computer readable program code stored on computer readable storage medium embodied therein for causing a computer to transfer data over a master driven TDD/TDMA based wireless network characterized in that it operates with minimum delay in end-to-end transmission by including:
computer readable program code means configured for achieving optimum time slot utilization by minimizing the number of baseband packets created for each Link layer packet, each baseband packet being of a size corresponding to one of a permitted set of capacities '$C_1, C_2, \ldots C_n$', and
computer readable program code means configured for implementing optimum sharing of bandwidth, higher link utilization and low baseband packet queue occupancy by adaptive scheduling of the transmission of said baseband packets in said queues.

The said computer readable program code means configured for minimizing the number of baseband packets created for each L2CAP packet is a Segmentation and Reassembly-Optimum-Slot Utilization ("SAR-OSU") algorithm comprising converting said L2CAP packet into as many baseband packets of highest capacity Cn as possible and repeating the conversion process on the unconverted bytes using each successive lower capacity baseband packet size until all the unconverted bytes have been converted into baseband packets.

The master driven TDD/TDMA based wireless network is a Bluetooth network and Link layer packet is L2CAP packet.

The said computer readable program code means configured for adaptive scheduling for transmission is an 'AFP' algorithm whereby a queue with a size greater than a defined threshold is continuously polled for a defined number of transmissions as long as its size remains greater than the defined threshold.

The above computer program product further comprises a computer readable program code means configured for increasing the transmission polling interval for a baseband packet transmission queue with low packet traffic such as when a 'poll' packet is sent instead of a 'data' packet.

BRIEF DESCRIPTION OF THE DRAWINGS

The invention will now be described with reference to the accompanying drawings.

DETAILED DESCRIPTION OF THE DRAWINGS

Figure 1:
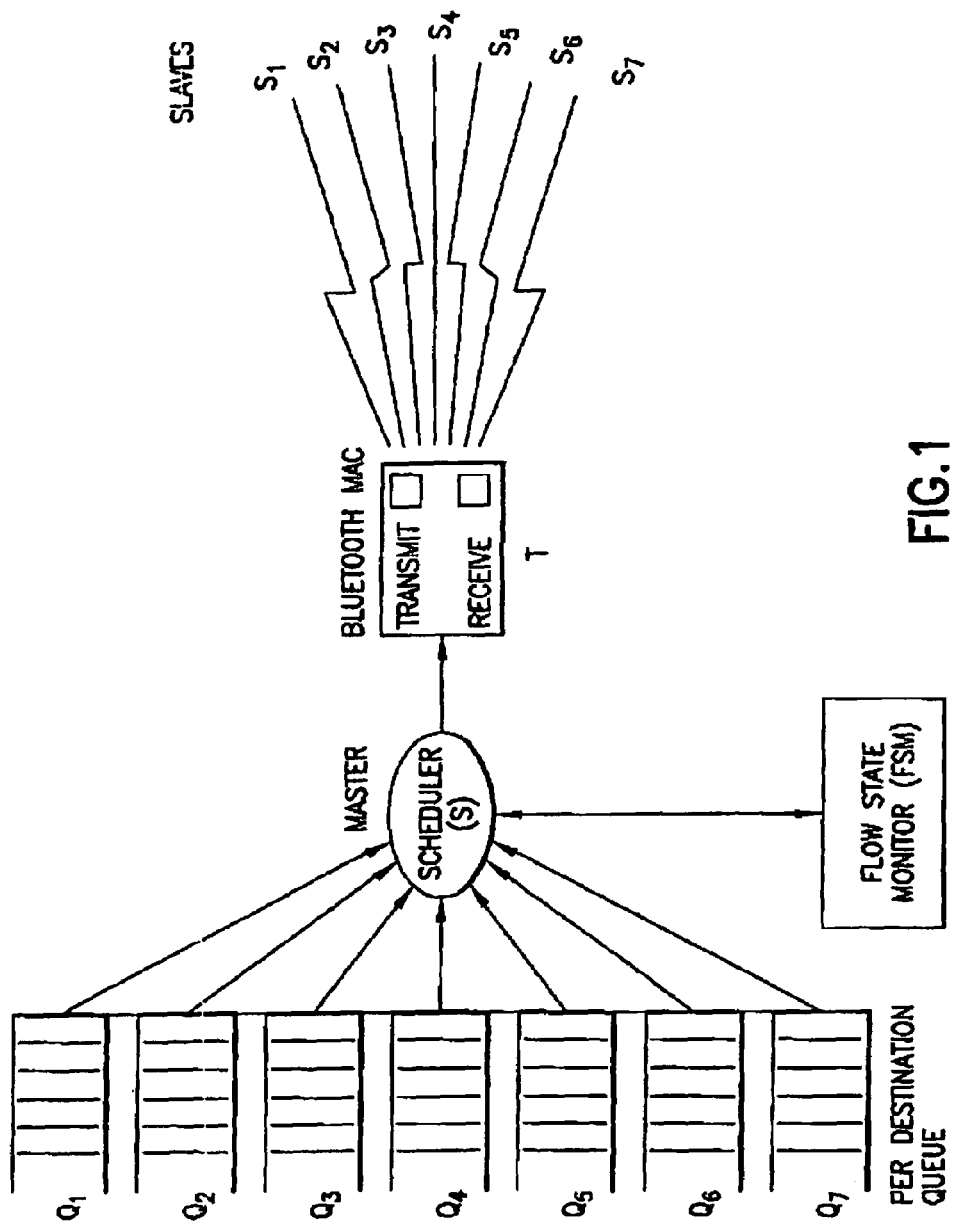
FIG. 1 shows a typical TDD/TDMA wireless system such as a Bluetooth system.

FIG. 1 shows a typical master driven TDD/TDMA system such as a Bluetooth system. There exist per destination queues (Q1 to Q7) at the master. The Flow State Monitor (FSM) monitors the flow state of each queue and the scheduler (S) correspondingly polls the queue for transferring the baseband data packets to the transceiver (T). The baseband packets in each queue are created as a result of the segmentation process in the link layer.

Figure 2:
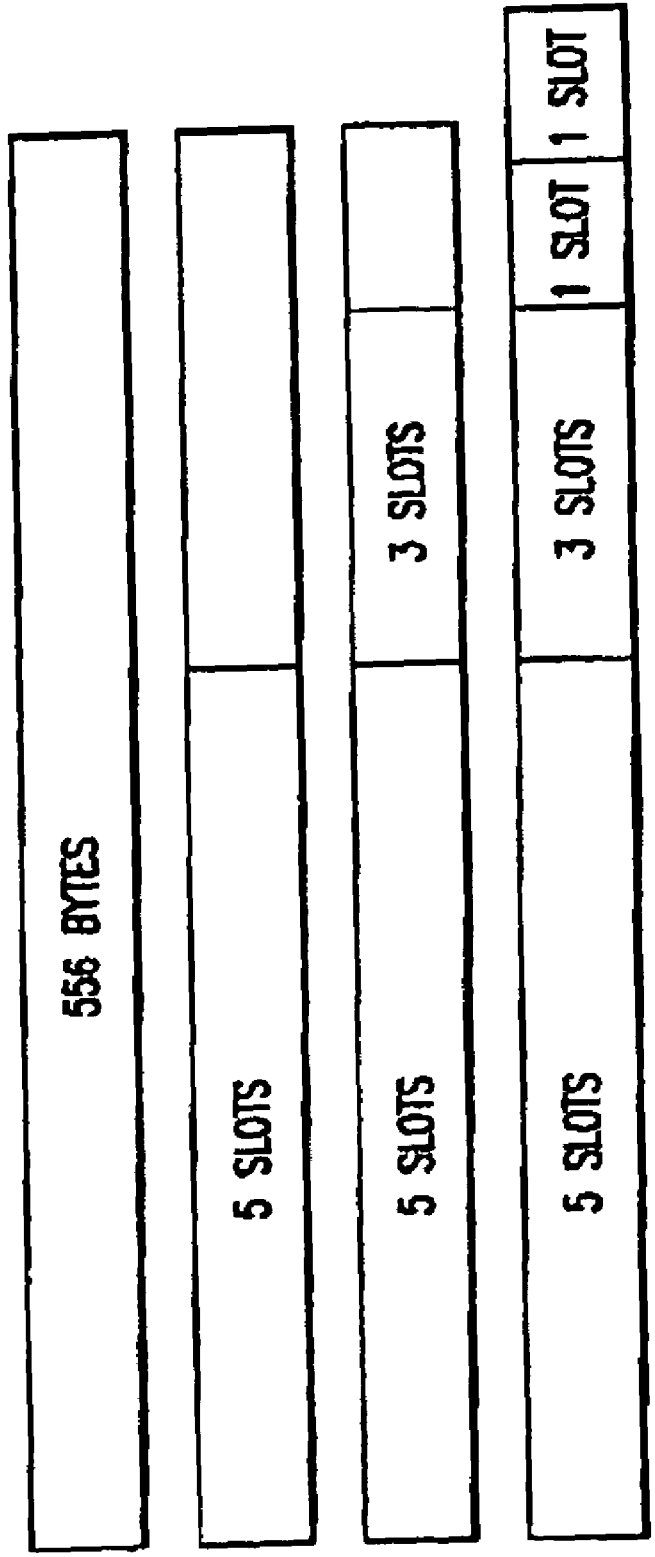
FIG. 2 shows a typical segmentation output in a bluetooth system.

The invention functions at two levels:
1. Segmentation And Reassembly (SAR) in the Link layer for fragmenting large application data packets into the minimum number of smaller baseband packets.
2. Medium Access Control (MAC) scheduling in the transmission of said baseband packets to achieve the following:
   a. optimal sharing of bandwidth
   b. high link utilization
   c. Low queue occupancy in baseband buffers FIG. 2 shows an example of SAR of a 556 bytes Link layer packet for a Bluetooth system. The SAR system first breaks the 556 bytes Link layer packet into as many 5 timeslots size packets as possible—in this case 1 packet. The remaining bytes are then converted into as many three time slot packets, as possible—in this case 1 such packet. Finally, the last remaining bytes are converted into 1 timeslot packet—in this case 2 such packets.

The common applications running over Bluetooth have data packets of the order of kilobytes. However, the baseband packets that can be sent through the link in Bluetooth are very small in comparison, 339 bytes being the maximum. As a result just after the application data packets are received, they need to be fragmented into baseband packets, which will be reassembled into application data packets at the receiving end. The L2CAP layer in Bluetooth is responsible for this purpose. The baseband packets can span 1, 3 or 5 transmission time slots. If the application data packets are large, it would be wise to fragment into 5 timeslots packets so as to reduce the total transmission delay. Data packets smaller than one time slot, if fragmented as five time slot packets, will waste time slots and hence degrade link utilization.

An important issue is that if the link is erroneous, it is not advisable to send 5 slot packets as then the goodput drastically reduces due to errors. Instead if we send a 1-slot packet, the degradation in goodput will not be significant. Also if one or two voice connections (SCO links) are existing, it will not be feasible to send 5-slots or 3-slots baseband packets.

Figure 3:
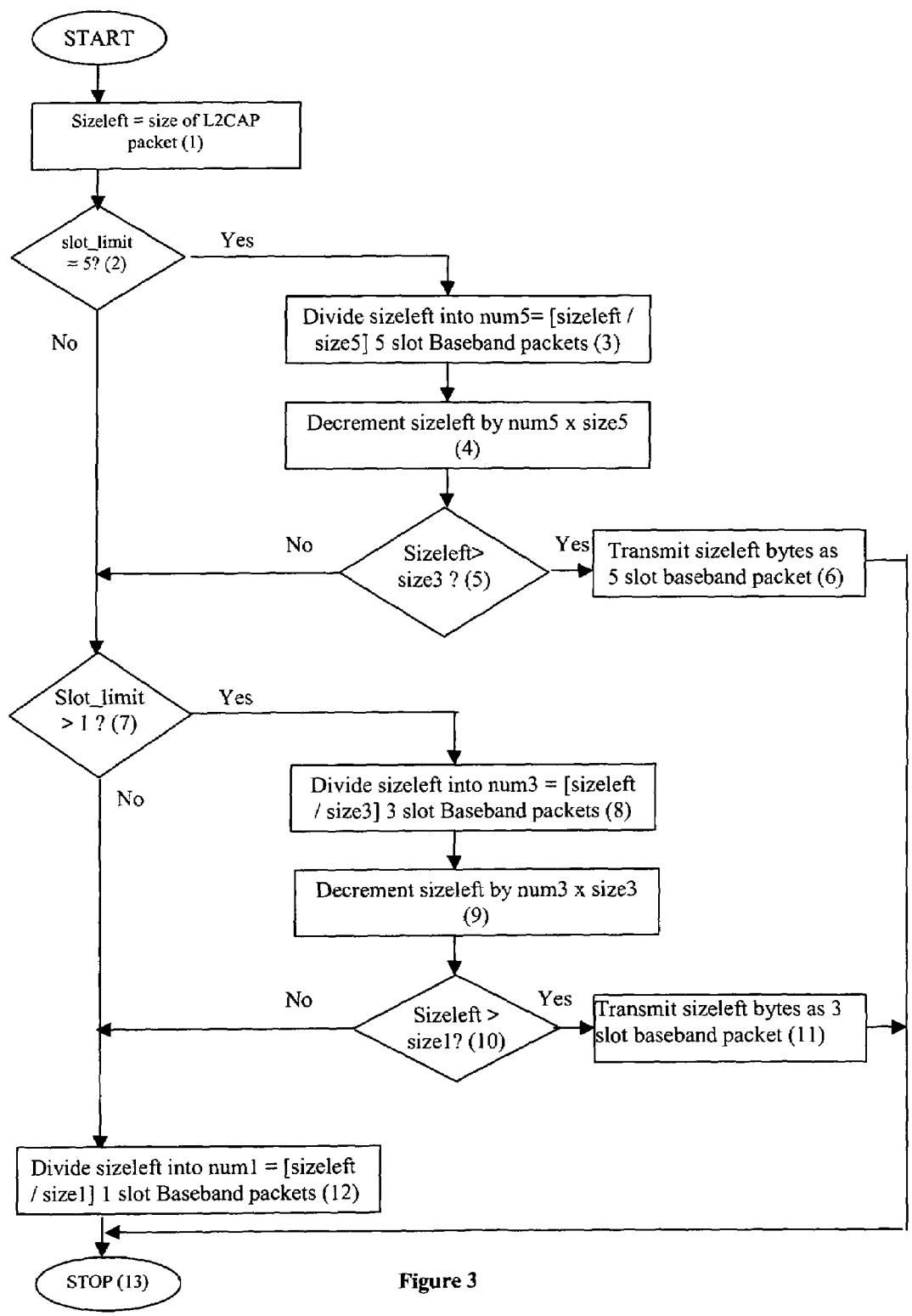
FIG. 3 shows a flowchart describing the segmentation process according to this invention.

FIG. 3 describes the operation of the SAR-OSU algorithm for creating a minimum number of baseband packets from each application packet.

The algorithm is implemented as a software method as under:

Method Parameters
slot_limit: This denotes the maximum number of slots across which the baseband packets can be transmitted.
size1: This variable represents the size in bytes of a 1 slot baseband packet
size 3: This variable represents the size in bytes of a 3 slot baseband packet
size 5: This variable represents the size in bytes of a 5 slot baseband packet Method Variables:
Sizeleft: This variable keeps track of the number of bytes left in the application data packet to be divided into baseband packets.
num1: This variable stores the number of 1 slot baseband packets formed by the algorithm.
num3: This variable stores the number of 3 slot baseband packets formed by the algorithm.
num5: This variable stores the number of 5 slot baseband packets formed by the algorithm.

Referring to FIG. 3, the steps are:
1) Initialize sizeleft to the size of the L2CAP packet
2) If slot_limit=5, then
3) Divide sizeleft into num5=[sizeleft/size5]5 slot baseband packets
4) Decrement sizeleft by num5 X size5
5) If sizeleft>size3, then
6) Transmit sizeleft bytes as 5 slot baseband packets, and
13) Stop
if sizeleft≦size 3 then
7) If slot_limit>1 then
8) Divide sizeleft into num3=[sizeleftsize3]3 slot baseband packets
9) Decrement sizeleft by num3 X size3

10) If sizeleft>size1, then
11) Transmit sizeleft bytes as 3 slot baseband packets.
and 13) Stop
if sizeleft≦size 1 or slot_limit≦1, then
12) Divide sizeleft into num1=[sizeleftsize1]1 slot baseband packets
and 13) Stop The above pseudocode describes the SAR-Optimum-Slot-Utilization (SAR-OSU) algorithm.

This algorithm aims to decrease the transmission delay of L2CAP packets by reducing the queuing delay of baseband packets. The lesser the number of baseband packets per L2CAP packet, the lesser is the end-to-end delay since only a single baseband packet is sent each time a slave is polled. Hence this algorithm maximizes the data sent each time a slave is polled by preferentially sending multi-slot packets.

Slot_limit

Since the Link Manager is aware of the number of voice connections, it will know the maximum number of slots across which a baseband packet can be sent. As it also keeps track of the link status, it will know the best baseband packet type in which the application data packets can be fragmented into. We define maximum slots per packet (slot_limit) as the maximum number of slots across which a baseband packet can be sent.

Signalling Packet to Convey Value of Slot_limit from Link Manager Protocol ("LMP") to L2CAP Since the SAR is performed at the L2CAP layer and slot_Limit is known to the LMP, which is a layer below L2CAP, we need a mechanism by which slot_limit can be conveyed to the L2CAP. The LMP will use a signalling packet to convey slot_limit to the L2CAP, which then uses SAR-OSU algorithm to perform SAR on every following L2CAP packet.

Figure 4:
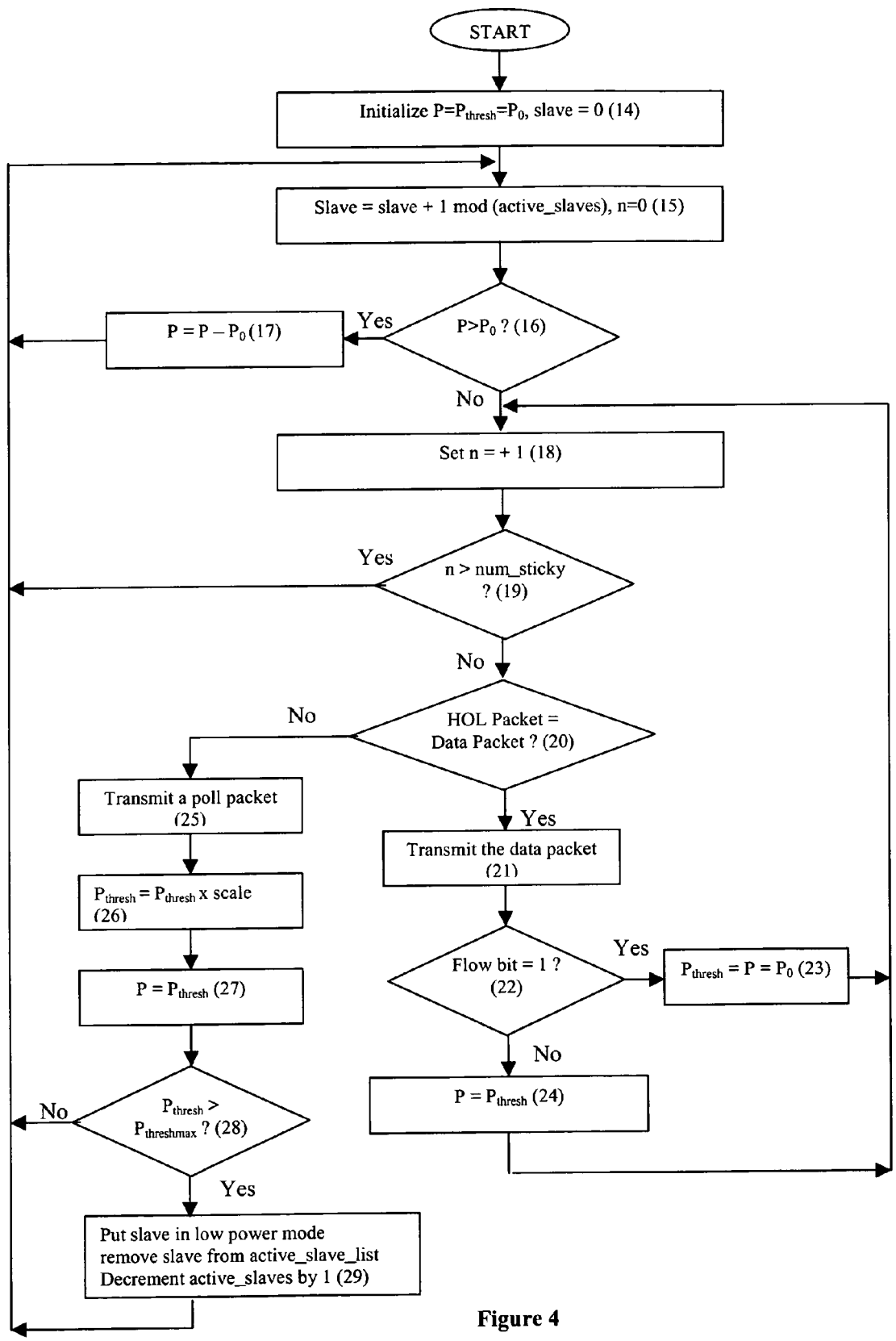
FIG. 4 shows a flowchart describing the adaptive polling process according to this invention.

FIG. 4 shows the operation of the Adaptive Flow-based Polling (AFP) algorithm.

The algorithm is implemented as a software method, as shown below:

Environment Parameters:

$P_0$ seconds: Polling interval established during connection setup between master and slave.

Method Parameters num_sticky: This is the number of baseband packets transmitted successively from a queue with high backlog (as indicated by flow bit set).

Scale: This parameter is the factor by which the Polling interval is increased for adaptive polling.

buf_thresh: This parameter is the minimum number of baseband packets in the queue for which the flow bit is set.

$P_{threshmax}$: This is the maximum threshold on polling interval for a slave after which it is put into a low power mode.

Active_slaves: This denotes the number of slaves with active connections. (Maximum=7).

Active_slave_list: This is a list of the slaves with active connections. (Maximum size of list=7).

Method Variables:

flow: This variable characterizes the traffic status.

P seconds: This variable keeps track of the time left for the next polling instant of the slave.

$P_{thresh}$ seconds: This variable parameter determines the interval between the time at which a slave was last polled and the next polling instant (Polling Interval).

Slave: This variable keeps track of the slave being currently serviced.

N: This variable keeps track of the number of baseband packets that have been sent while servicing a slave with flow set.

NOTE: P, n and $P_{thresh}$ are maintained on a per-slave basis for each of the active slaves.

We assume that the active slaves are numbered 0 to (active_slaves−1).

The steps followed are given below and are identified by numbers given in the figure.

14) Initialization
Set P and $P_{thresh}$ to the initial value of $P_0$
Initialize slave to −1
15) Increment slave by 1 in modulo (active_slaves).
Set n to 0
16) If this is not time to poll slave (ie if P is greater than $P_0$). then
17) Decrement P by the polling interval $P_0$ (effectively skipping slave and decreasing the time left for slave to be polled)
and Goto (15)

else if slave is to be polled then 18) Increment n by 1, and
19) If n>num_sticky goto 15, else
20) If the HOL (head of line) baseband packet is a data packet, then
21) Transmit the data packet.
22) If flow is set, then
23) Reset P and $P_{thresh}$ to the value of $P_0$
24) Else if flow is not set, set P to the value of $P_{thresh}$, and goto (18)
if HOL baseband packet is not a Data packet-
25) Transmit a Poll packet
26) $P_{thresh}$=scale X $P_{thresh}$
27) Set P to the value of $P_{thresh}$
28) If $P_{thresh}>P_{threshmax}$, then
29) Put slave into a low power mode
and, Remove slave from active_slave_list
and, Decrement active_slaves by 1
and Goto 15
if $P_{thresh}$ is not >$P_{threshmax}$ then Goto 15

The above pseudocode describes the Adaptive Flow-based Polling scheduling algorithm.

This method is unlike the standard Round Robin scheduling system. In the case of Round Robin scheduling each slave's queue is served in a cyclic fashion with one packet (data or poll) being transmitted at a time. There is a fixed polling interval for every slave, which remains constant. Round Robin Scheduling achieves fair sharing of bandwidth and high link utilization when each channel (master-slave connection) in the piconet is equally busy, but this rarely is the case. Each slave in a piconet will have varying inflow of data and hence many a baseband slot will get wasted in the process, decreasing link utilization and at the same time being unfair to the slaves with heavy data traffic (unfair sharing of bandwidth). Also, it serves better purpose if we can serve the slaves, with greater backlogs in their queues, more frequently, thus ensuring low queue occupancy.

The AFP algorithm overcomes the drawbacks of Round Robin Scheduling by incorporating three new methods:

Slave Priority Based on Flow Bit

Per-slave baseband queues at the master and similar queues at the slave are maintained (as shown in FIG. 1). We assign priority to these queues based on the pending data in the corresponding L2CAP buffers, and use the flow bit present in the payload header field of the baseband packet for this purpose. This flow bit is used to convey flow information at the L2CAP level as intended in the Bluetooth specification [BLU]. It is set when the number of packets in the L2CAP buffer for a particular slave is larger than a threshold buf_thresh. The LMP at the master monitors the flow bit of the baseband packets sent/received and conveys the traffic status to the Baseband. We define a variable flow to quantify the traffic rate on the wireless channel, which is set when the flow bits for packets travelling in either direction is turned on. It is determined by performing a logical OR-ing of the flow bits of the baseband packets sent and received for each master-slave connection (channel).

Stickiness

In the case of Round-Robin scheduling, one packet is served at a time from each baseband queue. However the slaves with high data inflow may have their queues full while baseband slots are being wasted for slaves with low queue backlog. These queues are cleared by transmitting a number of baseband packets successively (quantified by a parameter num_sticky). These queues can again be identified by monitoring the flow bits of the baseband packets dequeued and flow is used for the same.

Adaptive Polling Interval

Polling interval for a particular slave is defined as the maximum time limit, before which it must be served by the master and is decided based on QoS requirements. In the case of Round-Robin scheduling, each slave has equal Polling interval. For connections with no data to be transmitted, baseband slots are used to send poll packets. However, Poll packets do not have any payload and lead to underutilization of the available bandwidth. The Polling interval for queues with low data are increased, thus reducing the number of poll packets, and define a multiplying factor, scale, for the purpose. These queues can be identified by monitoring the HOL (head of line) baseband packets of the queues. Absence of any baseband packet denotes low data rate for the queue and hence polling interval needs to be increased. After increasing the Polling interval to a certain threshold, $P_{threshmax}$, a slave can be put into a low power mode (Sniff, Hold or Park) because of the inactivity associated with the slave.

Figure 5:
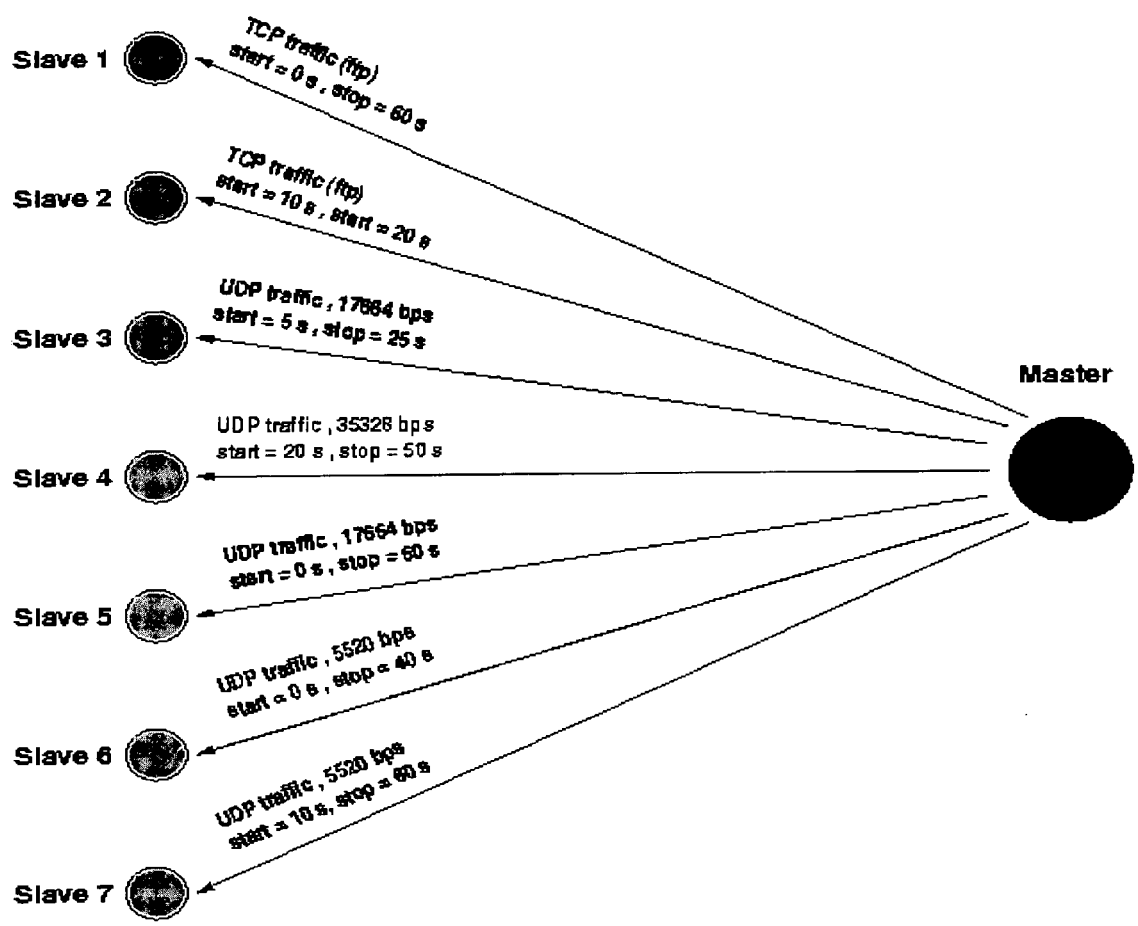
FIG. 5 shows a scenario for a simulation carried out to verify the results of a system according to this invention.

In FIG. 5 a simulation of a Bluetooth network is analyzed. The network that is modeled is a Bluetooth piconet with one master (Master) and seven slaves (slave 1 to slave 7). It is assumed that all the slaves are in the active state and are engaged in different types of data transfer as explained below. Since the wireless link is the bottleneck in terms of delay, only the traffic between the master and the slaves is considered.

Each simulation run involves one data transfer session for each slave. It accounts for the bursty and persistent traffic, as present in a practical scenario. For bursty traffic, CBR traffic over UDP is used and for persistent traffic, ftp over TCP.

To make the scenario simple, FEC is not considered and hence the baseband packet sizes for 1 slot, 3 slots and 5 slots baseband packets are 27, 183 and 339 bytes respectively. Looking at the popularity of TCP Reno [KESH], this variant for TCP applications is used.

The following are the assumptions made for the application data packets in the simulation tests:

Packet size=552 bytes size of ACK=40 bytes (for TCP applications only)

The values of the method parameters that we have chosen for the simulation are as follows:

$P_0$=35 ms.

active_slaves=7

$P_{threshmax}$=1120 ms.

fb_thresh=2

Figure 6:
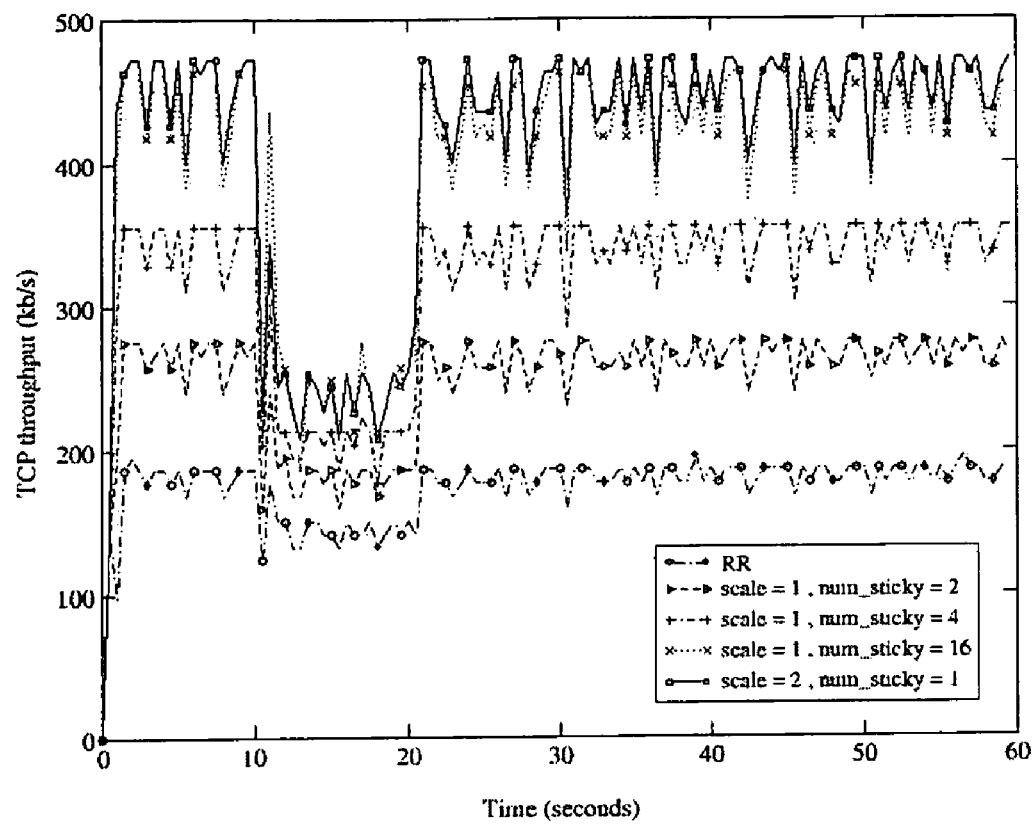
FIG. 6 shows the results of the simulation for the case when parameter 'scale' is set to 1.

FIG. 6 shows the results obtained from the simulation. The TCP throughput for different values of the parameter num_sticky and scale in the AFP algorithm is compared with that of the Round-Robin (RR) algorithm. From this graph, it is clearly observed that the AFP gives significantly improved performance compared to RR. The throughput of AFP increases with increase in the value of num_sticky when scale is maintained at 1. AFP gives better performance with scale set to 2 wherein the throughput is approximately the same as AFP with scale equal to 1 and a num_sticky value of 16.

Figure 7:
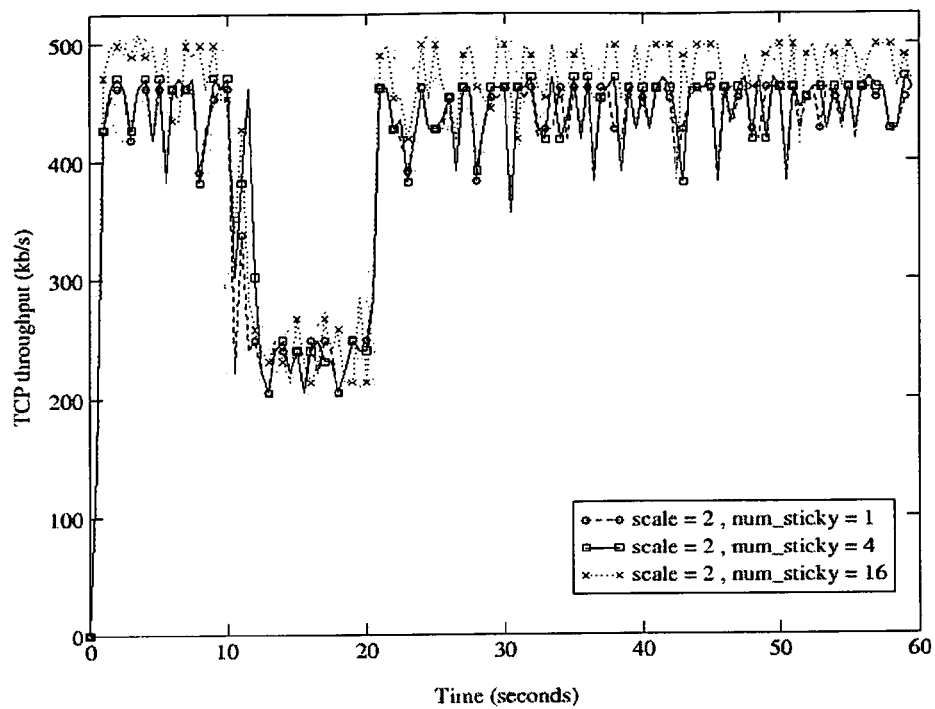
FIG. 7 shows the results of the simulation for the case when parameter for 'scale' set to 2.

In FIG. 7, the TCP throughput of AFP with scale set to 2 is compared for num_sticky values of 1, 4 and 16. From this graph, it is observed that the throughput performance of AFP for a num_sticky value of 16 is better than that for a num_sticky value of 1 and 4, the latter two having almost the same throughput. However, the performance improvement obtained for a num_sticky value of 16 is not very significant.

Figure 8:
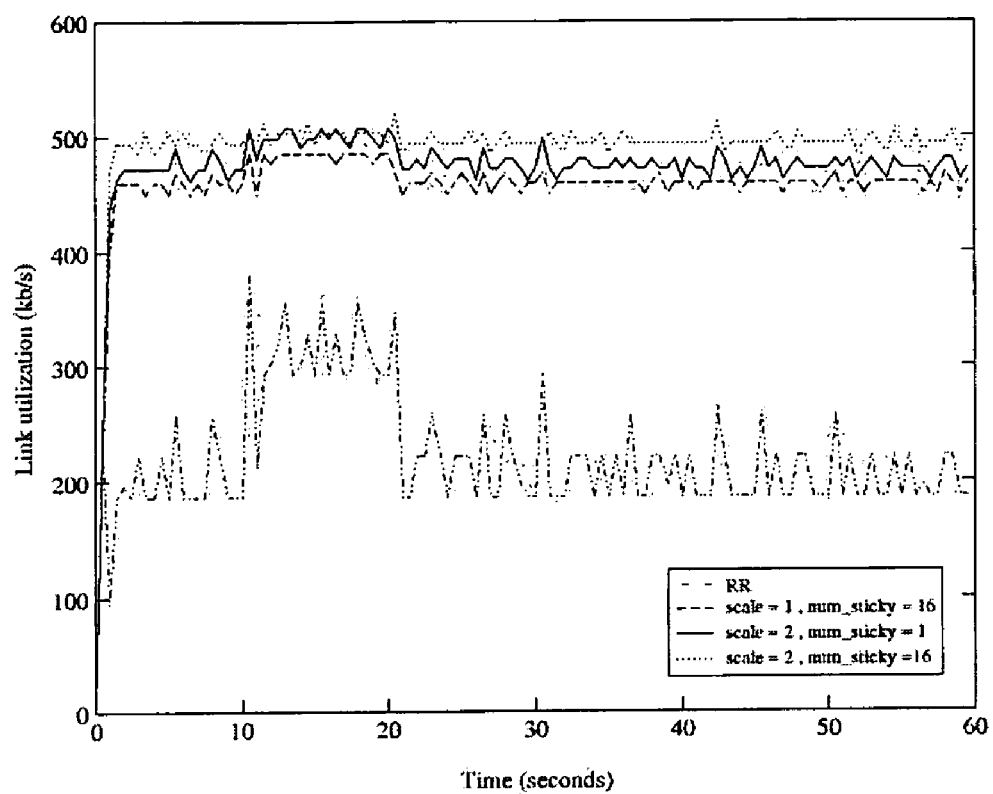
FIG. 8 shows the results of the simulations for different values of "scale" and 'num_sticky'.

In FIG. 8, the link utilization for AFP under different values of scale and num_sticky is compared. From the graph, it is seen that the link utilization for all variations of AFP is very high compared to Round-Robin. With scale set to 1 (ie when the polling interval is kept unchanged despite change in flow state of the link) and num_sticky set to a value greater than one, AFP reduces queue occupancy by transmitting multiple packets consecutively from queues with a high backlog, hence preventing queue overflow and reducing end-to-end delay. However in the case that both scale equals 2 (adaptive polling interval) and num_sticky is greater than one (queue stickiness incorporated), AFP causes a marked increase in the end-to-end delay of intermittent CBR traffic because flow is set infrequently for such bursty sources. Additionally, each cycle has a larger duration due to other slaves being served num_sticky times. From these results, it can be inferred that AFP always gives better performance than round-robin and gives the best overall performance when (i) scale equals 1 and num_sticky has a value greater than one and when (ii) scale equals 2 and num_sticky equals one.

Figure 9:
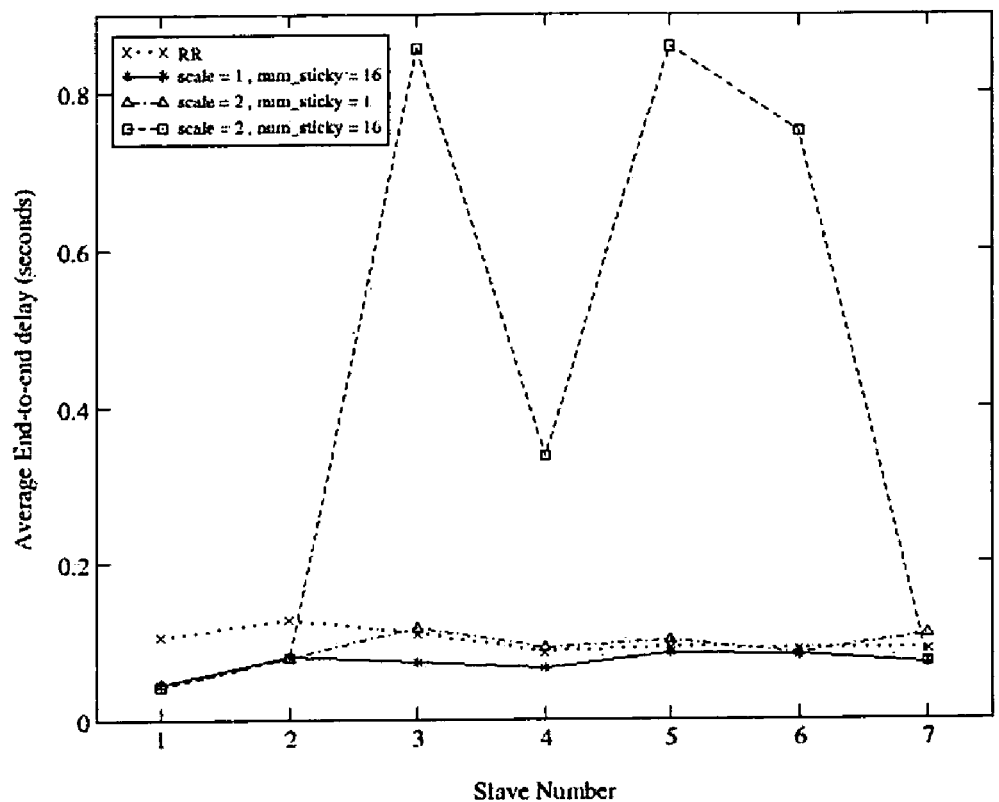
FIG. 9 shows the average end-to-end delay with AFP variations.

In FIG. 9, the average end-to-end delay is plotted for each of the slaves under different variations of AFP. The AFP algorithm is found to have the lowest end-to-end delay when scale=1 while the highest end-to-end delay occurs when scale=2 and num_sticky is greater than one. By setting scale equal to 2, AFP increases the polling interval for those queues that have less data, and hence decreases the number of poll packets which otherwise cause underutilization of available bandwidth.

REFERENCES

[BERK]: S. McCanne and S. Floyd, "ns-Network Simulator", http://www-mash.cs.berkeley.edu/ns

[KESH]: Keshav, S., "An Engineering Approach to Computer Networking: ATM Networks, the Internet and the Telephone Network", Addison-Wesley, 1997.

[BLU]: The Bluetooth Special Interest Group, "Specification of the Bluetooth System 1.0b, Volume 1: Core," http://www.bluetooth.com, December 1999

[BHA]: Bhagwat, P. et al., "Using channel state dependent packet scheduling to improve TCP throughput over wireless LANs" Wireless Networks 3(1997), pp. 91–102, 1997

[KAL]: Kalia M., Bansal D., Shorey R., "MAC Scheduling and SAR policies for Bluetooth: A Master Driven TDD Pico-Cellular Wireless System", IEEE International Workshop on Mobile Multimedia and Communication (MoMuC' 99), San Diego, pp. 384–388, Nov. 1999

U.S. Pat. No. 4,949,395: Method and arrangement for dynamically allocating time-slots to connections in a digital mobile radio syaytem U.S. Pat. No. 6,069,885: Method and apparatus for providing high speed services using a wireless communications systems.

U.S. Pat. No. 6,075,791: System for guaranteeing data transfer rates and delays in packet networks.

U.S. Pat. No. 5,625,625: Method and apparatus for partitioning data load and unload functions within an interface system for use with an asynchronous transfer mode system.

U.S. Pat. No. 5,844,890: Communications cell scheduler and scheduling method for providing proportional use of network bandwidth International Patent No. WO09904521A2: A method and apparatus for segmentation, reassembly and inverse multiplexing of packets and ATM cells over satellite/wireless networks U.S. patent application Ser. No. 09/434,583: Medium aceecss control scheduling methodology in master driven time division duplex pico-cellular wireless systems. [Filed November 99, IBM T.J. Watson Research Centre, NJ]

We claim:

1. A computer implemented system for transferring data over a master driven TDD/TDMA based wireless network characterized in that it operates with minimum delay in end-to-end transmission by including:
    means for achieving optimum time slot utilization by minimizing the number of baseband packets created for each Link layer packet, each baseband packet being of a size corresponding to one of a permitted set of capacities 'C1, C2, . . . Cn', wherein minimizing the number of baseband packets created for said each Link layer packet comprises converting said Link layer packet into as many baseband packets of highest capacity 'Cn' as possible and repeating a conversion process or unconverted bytes using each successive lower capacity baseband packet size until all the unconverted bytes have been converted into said baseband packets; and
    means for optimum sharing of bandwidth, higher link utilization and low baseband packet transmission queue occupancy by adaptive scheduling of the transmission of said baseband packets in said queues.

2. A system as claimed in claim 1, wherein said means for minimizing the number of baseband packets created for said each Link layer packet is an Segmentation and Reassembly Optimum Slot Utilization (SAR-OSU) algorithm.

3. A system as claimed in claim 1, wherein said master driven TDD/TDMA based wireless network comprises a Bluetooth network and said Link layer packet comprises a Logical Link Control and Adaptation Protocol (L2CAP) packet.

4. A system as claimed in claim 1, wherein said means for adaptive scheduling of transmission is an Adaptive Flow-based Polling (AFP) algorithm whereby a baseband packet transmission queue with a size greater than a defined threshold is continuously polled for a defined number of transmissions as long as its size remains greater than said defined threshold.

5. A system as claimed in claim 1 further comprising means for increasing the transmission polling interval for a baseband packet transmission queue with low packet traffic when a 'poll' packet is sent instead of a 'data' packet.

6. A computer implemented method for transferring data over a master driven TDD/TDMA based wireless network characterized in that it operates with minimum delay in end-to-end transmission by:
    achieving optimum time slot utilization by minimizing the number of baseband packets created for each Link Layer packet, each baseband packet being of a size corresponding to one of a permitted set of capacities 'C1, C2, . . . Cn', wherein minimizing the number of baseband packets created for said each Link layer packet comprises converting said Link layer packet into as many baseband packets of highest capacity 'Cn' as possible and repeating a conversion process on unconverted bytes using each successive lower capacity baseband packet size until all the unconverted bytes have been converted into said baseband packets; and
    maintaining optimum sharing of bandwidth, higher link utilization and low baseband packet transmission queue occupancy by adaptive scheduling of the transmission of said baseband packets in said queues.

7. A method as claimed in claim 6, wherein said minimizing the number of said baseband packets created for said each Link layer packet is by an Segmentation and Reassembly Optimum Slot Utilization (SAR-OSU) algorithm.

8. A method as claimed in claim 6, wherein said master driven TDD/TDMA based wireless network comprises a Bluetooth network and said Link layer packet comprises a Logical Link Control and Adaptation Protocol (L2CAP) packet.

9. A method as claimed in claim 6, wherein said adaptive scheduling of transmission is by an Adaptive Flow-based Polling (AFP) algorithm whereby a queue with a size greater than a defined threshold is continuously polled for a defined number of transmissions as long as its size remains greater than said defined threshold.

10. A method as claimed in claim 6 further comprising increasing the transmission polling interval for a baseband packet transmission queue with low packet traffic when a 'poll' packet is sent instead of a 'data' packet.

11. A computer program product comprising computer readable program code stored on computer readable storage medium embodied therein for causing a computer to transfer data over a master driven TDD/TDMA based wireless network characterized in that it operates with minimum delay in end-to-end transmission by including:
    a computer readable program code adapted to achieving optimum time slot utilization by minimizing the number of baseband packets created for each Link layer packet, each baseband packet being of a size corresponding to one of a permitted set of capacities 'C1, C2, . . . Cn', wherein minimizing the number of baseband packets created for said each Link layer packet comprises converting said Link layer packet into as many baseband packets of highest capacity 'Cn' as possible and repeating a conversion process on unconverted bytes using each successive lower capacity baseband packet size until all the unconverted bytes have been converted into said baseband packets; and
    a computer readable program code adapted to implementing optimum sharing of bandwidth, higher link utilization and low baseband packet queue occupancy by adaptive scheduling of the transmission of said baseband packets in said queues.

12. A computer program product as claimed in claim 11, wherein said computer readable program code adapted to minimizing the number of baseband packets created for said each Link layer packet is an Segmentation and Reassembly Optimum Slot Utilization (SAR-OSU) algorithm.

13. A computer program product as claimed in claim 11, wherein said master driven TDD/TDMA based wireless network comprises a Bluetooth network, and said Link layer packet comprises a Logical Link Control and Adaptation Protocol (L2CAP) packet.

14. A computer program product as claimed in claim 11, wherein said computer readable program code adapted to adaptive scheduling for transmission comprises an Adaptive Flow-based Polling (AFP) algorithm whereby a queue with a size greater than a defined threshold is continuously polled for a defined number of transmissions as long as its size remains greater than the defined threshold.

15. A computer program product as claimed in claim 11 further comprising a computer readable program code adapted to increasing the transmission polling interval for a baseband packet transmission queue with low packet traffic when a 'poll' packet is sent instead of a 'data' packet.

* * * * *